D. N. TANNER.
AUTOMOBILE SLED.
APPLICATION FILED MAY 27, 1913.

1,110,160.

Patented Sept. 8, 1914.

2 SHEETS—SHEET 1.

Witnesses

Inventor
Delbert N. Tanner

By Victor J. Evans
Attorney

D. N. TANNER.
AUTOMOBILE SLED.
APPLICATION FILED MAY 27, 1913.
1,110,160.
Patented Sept. 8, 1914.
2 SHEETS—SHEET 2.
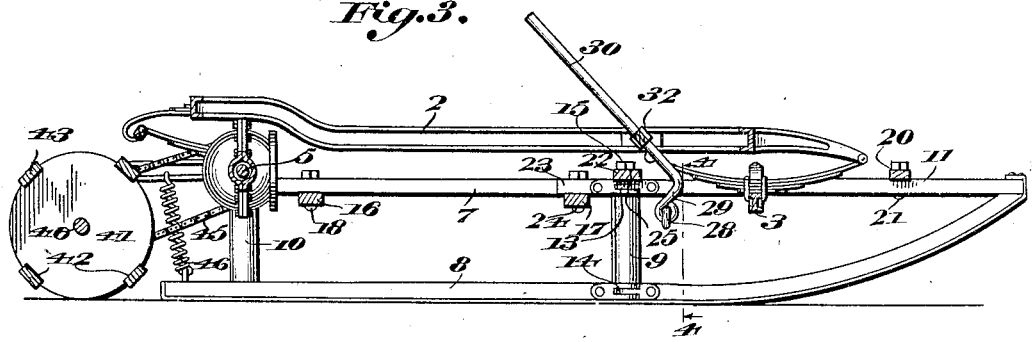
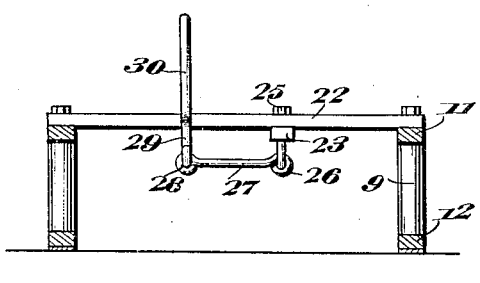
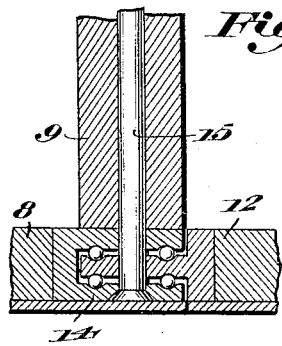
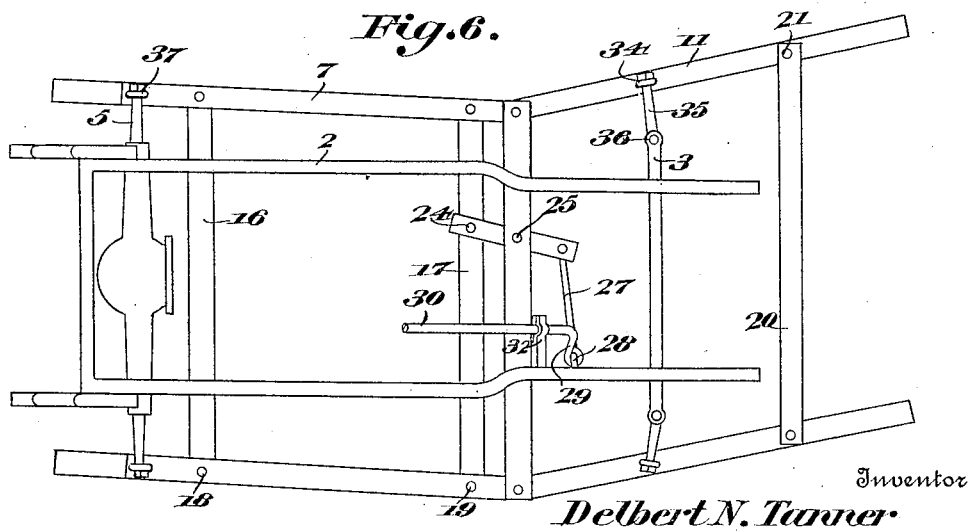
Witnesses
Inventor
Delbert N. Tanner
By Victor J. Evans
Attorney

UNITED STATES PATENT OFFICE.

DELBERT N. TANNER, OF GREAT FALLS, MONTANA.

AUTOMOBILE SLED.

1,110,160.  Specification of Letters Patent.  Patented Sept. 8, 1914.

Application filed May 27, 1913. Serial No. 770,194.

*To all whom it may concern:*

Be it known that I, DELBERT N. TANNER, a citizen of the United States, residing at Great Falls, in the county of Cascade and State of Montana, have invented new and useful Improvements in Automobile Sleds, of which the following is a specification.

This invention relates to automobile sleds, the object of the invention being to provide a sled which is designed to be attached to an automobile in place of the wheels.

The main object of the invention is to provide a novel construction of steering mechanism adapted to be coupled to and actuated by the steering shaft of an automobile, the said steering mechanism involving the use of runners the front and rear portions of which have a jointed connection whereby they are adapted to be turned relatively to each other in accordance with the direction in which it is desired to steer the machine.

With the above and other objects in view, the invention consists in the novel construction, combination and arrangement of parts herein fully described, illustrated and claimed.

Figure 1:
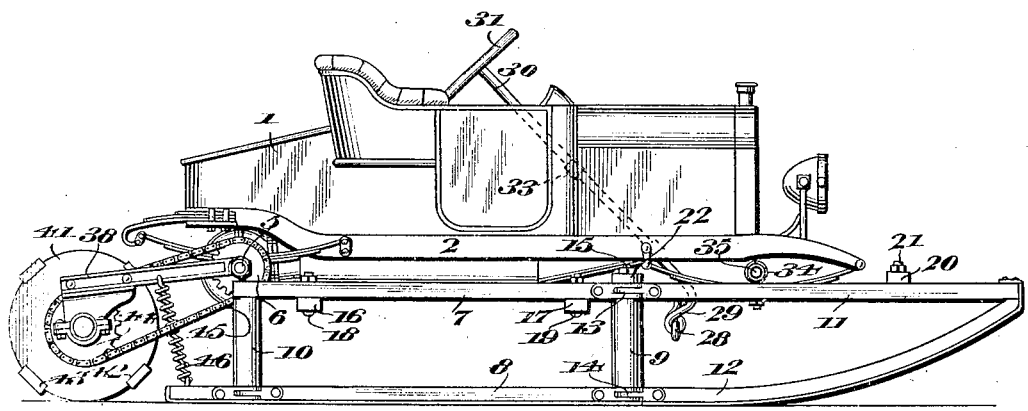
Figure 2:
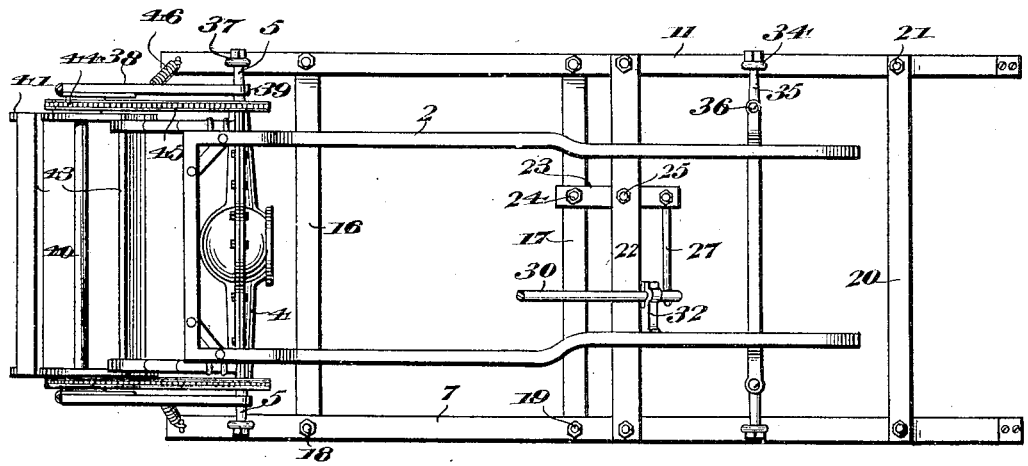

In the accompanying drawings: Figure 1 is a side elevation showing the sled of this invention applied to an automobile. Fig. 2 is a plan view of the sled omitting the body of the automobile. Fig. 3 is a vertical longitudinal section through the sled and propelling wheel. Fig. 4 is a cross section on the line 4—4 of Fig. 3 showing the steering connections. Fig. 5 is a detail vertical section through one of the runner joints. Fig. 6 is a diagrammatic plan view illustrating the angularity of the runner sections in relation to the machine frame.

Referring to the drawings, 1 designates the body of an automobile, 2 the side longitudinal frame bars of the machine, 3 the front axle and 4 the rear axle housing in which the divided rear axle sections are mounted, said sections being shown at 5.

In order to connect the sled of this invention to an automobile, the front and rear wheels thereof are removed as illustrated in Fig. 1 and the front and rear axles are supported upon the runners hereinafter particularly described, sprocket wheels 6 being placed on the axle sections 5 in place of the usual driving wheels.

The sled comprises a pair of side runners arranged in usual spaced relation to each other, each runner embodying front and rear sections having a pivotal relation with each other. Each rear runner section embodies a top rail 7 and a bottom rail 8 connected at their front ends by a post 9 and also connected adjacent to their rear ends by a post 10. The front section of each runner comprises a top rail 11 and a bottom rail 12, the bottom rail rounding upwardly as shown and converging into the forward extremity of the top rail 11 giving a general sled runner shape thereto.

The adjacent ends of the top rails 7 and 11 are provided with overlapping knuckles as shown at 13 and the bottom rails 8 and 12 are correspondingly provided with overlapping knuckles 14. A single pivot bolt 15 extends through the knuckles 13 and 14 and also centrally through the post 9 thereby forming a pivotal connection between the front and rear sections of each runner adapting said sections to be turned on a vertical axis relatively to each other.

The rear sections of the runners are connected by cross bars 16 and 17, said bars being pivotally attached at 18 and 19 to the top rails of said sections. In a like manner the top rails 11 of the front sections are connected by one or more cross bars 20 pivotally connected at 21 to the rails 11, all of the bars 16, 17 and 20 being parallel to each other, and the pivots 18, 19 and 21 of each of said bars being equidistant from each other. Another cross bar 22 connects the pivots 15 forming the vertical axes on which the front and rear runner sections turn.

23 designates a longitudinally extending tongue which is pivotally connected at 24 to the cross bar 17 and pivotally connected at 25 to the cross bar 22. Pivotally attached to the forward end of the tongue 23 by universal joint 26 is a link 27 which extends laterally away from the tongue 23 and is universally connected at 28 to a downwardly extending arm 29 on the forward and lower extremity of the steering shaft 30. This shaft inclines upwardly and rearwardly and is provided with the usual hand wheel 31 similar in function to the steering wheel now in common use in automobiles. The bearings for the steering shaft 30 are carried by the frame of the automobile, one of said bearings 32 being illustrated as fastened to one of the side bars 2 of the automobile frame and another bearing 33 being shown as fastened to the floor or the dash of the machine. In view of the arrangement just described it will now be understood that by turning the shaft 30, the pivot bolts 15 are moved laterally in one direction or the other thereby deflecting the jointed ends of the front and rear runner sections laterally to the right or the left as the case may be, the said distortion of the runners causing the front and rear sections thereof to assume an angular relation to each other thereby effecting a steering of the machine to one side or the other in accordance with the direction in which the steering shaft is turned.

Swivel eyes or bearings 34 are provided on the front runner sections to receive the spindles 35 of the steering knuckles 36 carried by the front axle 3. Similar swivel eyes 37 are carried by the rear runner sections to receive the spindle portions of the rear axle sections 5, thus providing for the mounting of the frame of the automobile on the sled.

The sprocket wheels 6 are made of considerably less thickness than the driving wheels of the automobile so that the sections 5 of the axle may project far enough beyond said sprocket wheels to be received in the eyes or bearings 37 and also to enable the frame of the propelling wheel hereinafter described to be mounted thereon. The frame of the propelling wheel comprises essentially the side bars 38 arranged in spaced relation to each other and provided at their forward ends with eyes or bearings 39 through which the driving shaft sections 5 pass, the frame of the propelling wheel being thus journaled on to the rear axle upon which it is adapted to swing as a center.

Journaled in the rear ends of the side bars 38 is the shaft 40 of the propelling wheel. This propelling wheel embodies a pair of oppositely arranged heads 41 of disk form provided in their peripheries with notches 42 in which the opposite extremities of a circular series of traction ribs or bars 43 are received and fastened, the said bars 43 being adapted to take a hold on the snow or road surface and being of such length that they will not become too deeply embedded in the snow where the latter is of considerable depth. At each end the propelling wheel has a sprocket wheel 44 fastened thereon and from each of the sprocket wheels 44 a sprocket chain 45 extends forward around one of the sprocket wheels 6 on the driving axle.

46 designates springs which act to yieldingly hold the bars 38 downwardly and maintain the propelling wheel in driving contact with the snow or other surface being traveled upon.

From the foregoing description it will now be readily understood that on account of the driving axle of the machine being actuated by the motor of the automobile, the propelling wheel will be driven constantly at a given speed in accordance with the relative diameters of the sprocket wheels 6 and 44, the propelling wheel being held in driving contact with the road surface. The machine is steered the same as an ordinary automobile by means of the usual hand wheel which acts to swing the front and rear sections of the runners relatively to each other as hereinabove particularly described and for the purpose stated. The propelling mechanism may run at a high rate of speed with perfect safety to the machine and the occupants thereof and by reason of the form of propelling wheel described and shown, the machine may be driven over roads, drifts and in other places where the snow is deep which would be practically impossible to negotiate with an automobile or with vehicles drawn by horses.

The sled if desired may be manufactured and used independently of an automobile, in which case a motor will of course be mounted on the sled and geared to the shaft or axle by which the sprocket wheels 6 are driven.

What I claim is:

An automobile sled comprising a pair of side runners each embodying a front section and a rear section, said sections being connected for relative turning movement on a vertical axis, manually controlled steering means for imparting such movement to said sections, the front runner sections being connected by pivotally attached bars, the rear runner sections being also connected by pivotally attached bars, a bar terminally connected with the jointed ends of the front and rear runner sections, and a steering shaft connected with the last named bar for turning said sections relatively to each other.

In testimony whereof I affix my signature in presence of two witnesses.

DELBERT N. TANNER.

Witnesses:
ALFRED MALMBERG,
B. M. BJORKLUND.